United States Patent
Soltis, Jr. et al.

(10) Patent No.: US 7,028,167 B2
(45) Date of Patent: Apr. 11, 2006

(54) CORE PARALLEL EXECUTION WITH DIFFERENT OPTIMIZATION CHARACTERISTICS TO DECREASE DYNAMIC EXECUTION PATH

(75) Inventors: Donald C. Soltis, Jr., Fort Collins, CO (US); Eric Delano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 10/091,084

(22) Filed: Mar. 4, 2002

(65) Prior Publication Data
US 2003/0167389 A1 Sep. 4, 2003

(51) Int. Cl.
*G06F 11/00* (2006.01)

(52) U.S. Cl. ..................................... 712/220

(58) Field of Classification Search ............... 712/220; 717/124, 126, 127, 131, 145, 151, 153, 155, 717/156, 159; 703/21, 23, 27
See application file for complete search history.

(56) References Cited

U.S. PATENT DOCUMENTS

| | | | | |
|---|---|---|---|---|
| 5,245,638 A * | 9/1993 | Gustafson | ..................... | 714/47 |
| 5,367,687 A * | 11/1994 | Tarsy et al. | ................. | 717/149 |
| 5,615,357 A * | 3/1997 | Ball | ............................ | 703/21 |
| 5,712,996 A * | 1/1998 | Schepers | .................... | 712/216 |
| 5,844,830 A * | 12/1998 | Gorshtein et al. | .......... | 708/495 |
| 5,909,565 A * | 6/1999 | Morikawa et al. | .......... | 712/200 |
| 5,966,537 A * | 10/1999 | Ravichandran | ............. | 717/158 |
| 5,999,736 A * | 12/1999 | Gupta et al. | ................ | 717/158 |
| 6,128,775 A * | 10/2000 | Chow et al. | ................ | 717/156 |
| 6,170,083 B1 * | 1/2001 | Adl-Tabatabai | ............. | 717/158 |
| 6,658,447 B1 * | 12/2003 | Cota-Robles | ................ | 718/103 |
| 6,715,062 B1 * | 3/2004 | Moore | ........................ | 712/227 |
| 6,738,955 B1 * | 5/2004 | Andersen et al. | .............. | 716/4 |
| 6,748,589 B1 * | 6/2004 | Johnson et al. | ............. | 717/150 |
| 6,772,312 B1 * | 8/2004 | Mes | .......................... | 711/169 |
| 6,810,094 B1 * | 10/2004 | Lu | ............................. | 375/341 |
| 6,848,100 B1 * | 1/2005 | Wu et al. | .................... | 717/157 |
| 6,856,951 B1 * | 2/2005 | Moona et al. | ................ | 703/22 |

* cited by examiner

*Primary Examiner*—Eric Coleman

(57) ABSTRACT

The invention provides a processor with two or more parallel instruction paths for processing instructions. The instruction paths may be implemented with a plurality of cores on a common die. Instructions of the invention are preferably processed within a bundle of two or more instructions of a common program thread; and each of the instruction paths preferably forms a cluster to process bundled instructions. Each of the instruction paths has an array of pipelined execution units. Initially, two or more of the parallel instruction paths processes the same program thread (one or more bundles) through the execution units, but with different optimization characteristics set for each path. Assessment logic monitors the processing of the initial program thread through the execution units and selects the heuristics defining which path is in the lead. The other instruction paths are then reallocated, or synchronized, with the optimization characteristics of the lead instruction path, or with similarly optimized characteristics, to process other bundles of the program thread; preferably, the lead path continues processing of the initial thread without being disturbed. For other program threads, the process may repeat in processing like bundles through multiple instruction paths to identify the preferred heuristics; and then synchronizing the multiple instruction paths to the optimized characteristics to improve per thread performance.

20 Claims, 3 Drawing Sheets

CORE PARALLEL EXECUTION WITH DIFFERENT OPTIMIZATION CHARACTERISTICS TO DECREASE DYNAMIC EXECUTION PATH

BACKGROUND OF THE INVENTION

Parallel execution of instructions through execution units, or pipelines, is known in the art to benefit EPIC processors. Certain of these processors utilize redundant processing cores on a common die. It is also known in the art to group execution units as a "cluster" to process instructions as a "bundle." One such bundle has three instructions; each cluster operates to process one bundle, or more, of instructions.

Certain EPIC processors utilize heuristics to suggest an answer to a program inquiry. By way of example, a processor's internal logic and software may monitor program cache misses during runtime activity and then apply a heuristic to correctly set prefetch hints.

VLSI designers and software engineers expend significant efforts optimizing hardware and software designs of EPIC processors, and their guiding heuristics, in order to accelerate the processing of instructions and/or bundled instructions through the pipelines. Further advancements are sought to provide faster and more stable processors.

The invention seeks to advance the state of the art in processing architectures by providing methods and systems for processing instructions through execution units. One feature of the invention is to provide a processor with dual cores for optimizing the processing of bundled instructions. Several other features of the invention are apparent within the description that follows.

SUMMARY OF THE INVENTION

The following patents provide useful background to the invention and are incorporated herein by reference: U.S. Pat. Nos. 6,188,633; 6,105,123; 5,857,104; 5,809,275; 5,778,219; 5,761,490; 5,721,865; and 5,513,363.

As used herein, an instruction is a "producer" when that instruction produces data to be written to a register and that data is available for bypassing or data forwarding. An instruction is a "consumer" when that instruction utilizes the bypass data.

In one aspect, the invention provides a processor with two or more parallel instruction paths for processing instructions. By way of example, the instruction paths may be implemented with a plurality of cores on a common die. Instructions of the invention are preferably processed within a bundle of two or more instructions of a common program thread; and each of the instruction paths preferably forms a cluster to process bundled instructions. Each of the instruction paths has an array of pipelined execution units. Initially, two or more of the parallel instruction paths processes the same program thread (one or more bundles) through the execution units, but with different optimization characteristics set for each path. Assessment logic monitors the processing of the initial program thread through the execution units and selects the heuristics defining which path is in the lead. The other instruction paths are then reallocated, or synchronized, with the optimization characteristics of the lead instruction path, or with similarly optimized characteristics, to process other bundles of the program thread; preferably, the lead path continues processing of the initial thread without being disturbed. For other program threads, the process may repeat in processing like bundles through multiple instruction paths to identify the preferred heuristics; and then synchronizing the multiple instruction paths to the optimized characteristics to improve performance.

Once allocated with optimized characteristics, each instruction path processes program threads to architected states with enhanced performance. The processor improves performance over the prior art by reallocating optimization characteristics of parallel execution units according to the preferred heuristics identified by pre-processing like bundles through the execution units. Effectively, lesser performing optimization characteristics are removed from the execution units for a given thread.

The assessment logic of one aspect includes dynamic hardware logic, preferably incorporated on the die with the parallel cores defining the instruction paths. The assessment logic may further include dynamic software. By way of example, the dynamic hardware logic and software may utilize one or both of CPU-bound heuristics and memory-bound heuristics to process the instructions through the pipelines. Memory-bound heuristics may for example include one or more of load and store routines, cache referencing, and latency to consumer requests. By way of example, load and store operations may be handled according to set heuristics.

Branch prediction—known to those skilled in the art—may also be incorporated with one aspect of the invention to improve processor performance. For example, by executing two identical bundles of a program thread through parallel processing clusters, but with unique optimization characteristics with each cluster, then a branch prediction heuristic may produce a better or faster result in one of the clusters as compared to the other. Accordingly, by reallocating both clusters with the optimized branch prediction characteristics, other bundles for that thread may efficiently process through the clusters with improved performance.

Prefetching is also known to those skilled in the art and may define other heuristics for use with the invention to improve processor performance. For example, by executing two identical bundles of a program thread through parallel processing clusters, but with different optimization characteristics within the clusters, then a prefetching heuristic may produce a better or faster result in one of the clusters as compared to the other. Accordingly, by reallocating both clusters with the optimized prefetch characteristics, other bundles for that thread may efficiently process through the clusters with improved performance.

The invention provides certain advantages, particularly in boosting single thread performance of a central processing unit (CPU). Specifically, in accord with the invention more instructions per cycle may be processed through the CPU for a given program because representative instructions from that program are speculatively processed, through multiple instruction paths, to define optimized processing characteristics. Future architected states for a program thread are then preferably processed across all instruction paths with the optimized characteristics.

In one aspect, a configuration mode selects heuristics for an instruction path, for example to define a prefetching algorithm. A plurality of instruction paths simultaneously process the same instruction bundles, but each with different optimization characteristics. Assessment logic monitors processing of the bundles and elects the fastest instruction path; it records the optimized heuristics and the other instruction paths are resynchronized with optimization characteristics of, or similar to, the lead instruction path to provide dynamic optimization for program threads. In one aspect, a hardware compiler dispatches program threads through the parallel instruction paths until the assessment logic determines the optimized characteristics for other paths; at that point, the hardware compiler dispatches program threads through the instruction paths, and without redundancy, to process the program. The assessment logic asymptotically approaches the "ideal" optimization characteristics with a longer time period for analyzing the processing of like instructions through various heuristics associated with the multiple instruction paths.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
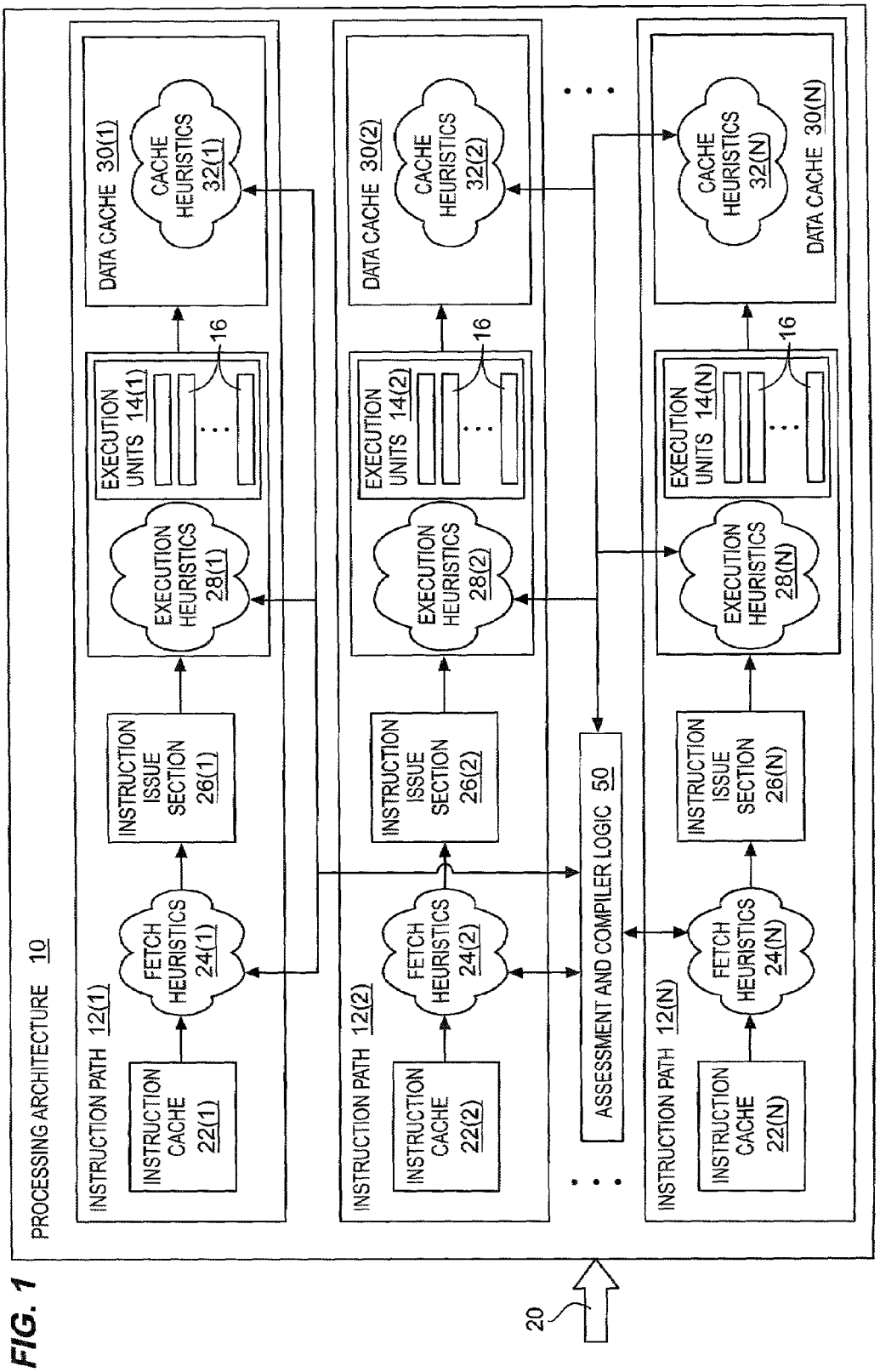
FIG. 1 schematically illustrates a processing unit of the invention for processing instructions through multiple instruction paths.

FIG. 1 shows a processor architecture 10 of the invention. Architecture 10 has an array of execution paths 12(1), 12(2) . . . 12(N) that process instructions, respectively, through execution units 14(1), 14(2) . . . 14(N). Execution units 14 include an array of pipeline execution units 16, known to those skilled in the art, to process instructions in individual stages, such as the fetch stage F, the register read stage R, the execute stage E, the detect exception stage D, and the write-back stage W. Each instruction path 12 may be implemented as a programming core within a EPIC processor, and on a common die; the invention of one embodiment forms two parallel clusters with only paths 12(1) and 12(2) on a die.

Processor 10 receives instructions from a main memory system instruction bus 20 and caches them in instruction caches 22(1), 22(2) . . . 22(N). For each path 12, fetching logic, illustratively shown as fetch heuristics 24, fetches and prefetches instructions from its cache 22 according to one or more characteristics defining the heuristics for such operations.

In the preferred embodiment, instructions are bundled within instruction cache 22 and then issued by an instruction issue section 26. In this embodiment, each instruction path 12 may be implemented as a cluster to process the bundled instructions; these clusters may also be formed as multiple programming cores on a common die.

For each path 12, the processing of instructions through execution units 14 is bound by execution heuristics 28. By way of example, speculative operations such as branch predictions, and/or other boundary heuristics (e.g., memory- or CPU-bound heuristics) are set according to execution heuristics 28. For each path 12, therefore, the execution of instructions through pipelines 16 progresses according to one or more characteristics defining the heuristics 28 for such operations.

A data cache 30 may be included for each instruction path 12; cache 30 may for example be used to store speculative transactions. Cache utilization is also preferably bound by cache heuristics 32. By way of example, control of cache misses may be set according to one or more characteristics defining the heuristics 32 for such operations.

Processor 10 also includes assessment and compiler logic 50. Logic 50 connects with each of heuristics 24, 28, 32, as shown. In operation, the assessment part of logic 50 monitors instruction processing within each instruction path 12; and the compiler part of logic 50 modifies characteristics set within heuristics 24, 28 and 32 to enhance processor performance in accord with the teachings herein. Those skilled in the art appreciate that logic 50 may alternatively connect with one or two of heuristics 24, 28, 32 without departing from the scope of the invention. Further, EPIC processors may include other heuristics and logic that may be monitored and perturbed in accord with the teachings herein, so as to enhance processor performance.

Figure 2:
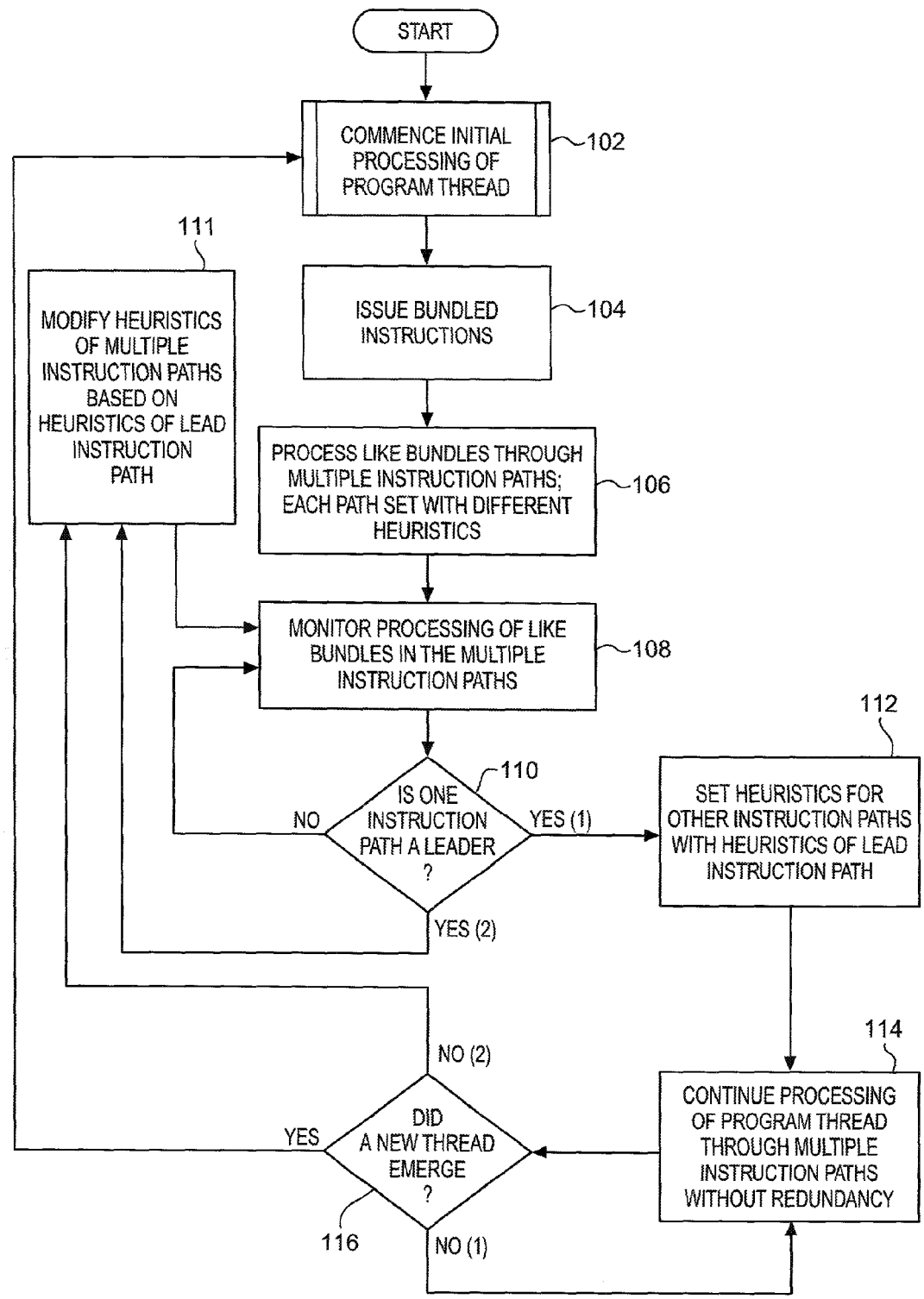
FIG. 2 shows a flowchart illustrating the optimizing of parallel instruction paths with heuristics defined by preprocessing of like instructions, in accord with the invention.

More particularly, FIG. 2 illustrates how instructions may be processed through processor architecture 10. An initial program thread commences at step 102. Instructions of the thread are issued as bundles, at step 104, and then simultaneously processed on two or more instruction paths (each with differing heuristics), at step 106. The assessment logic monitors processing of the bundles through the instruction paths, at step 108, until it determines that one particular instruction path is a leader, at step 110. If a lead instruction path is determined, a branch on YES(1) may occur and the other instruction paths are synchronized with the heuristics of the lead instruction path, at step 112. Advancing beyond step 110 may delay, as a matter of design choice, in order to asymptotically define better and better optimizing heuristics. After step 112, processing of the program thread then continues at step 114, without redundancy, through multiple instruction paths and preferably without interruption of processing within the lead instruction path.

If a new thread emerges, at step 116, instructions are optionally fetched and issued, again, as in step 102, 104 to again determine optimized heuristics for the multiple instruction paths. Processing otherwise may continue along the NO(1) branch to continue processing of the instructions in a common thread.

Optionally, instead of branching from step 110 to YES(1), a branch to YES(2) may advance. That is, instead of synchronizing the heuristics of other instruction paths to the heuristics of the lead instruction path, the process continues, at step 111, by modifying all, or nearly all, of the heuristics of the multiple instruction paths so as to incrementally fine tune the heuristics for all paths; such modification may for example include modifying these heuristics with characteristics similar to the lead path heuristics. A branch to step 111 could also occur after step 112, such as after a preset time period and before another thread is detected, as indicated by the NO(2) branch from step 116 to step 111.

Figure 3:
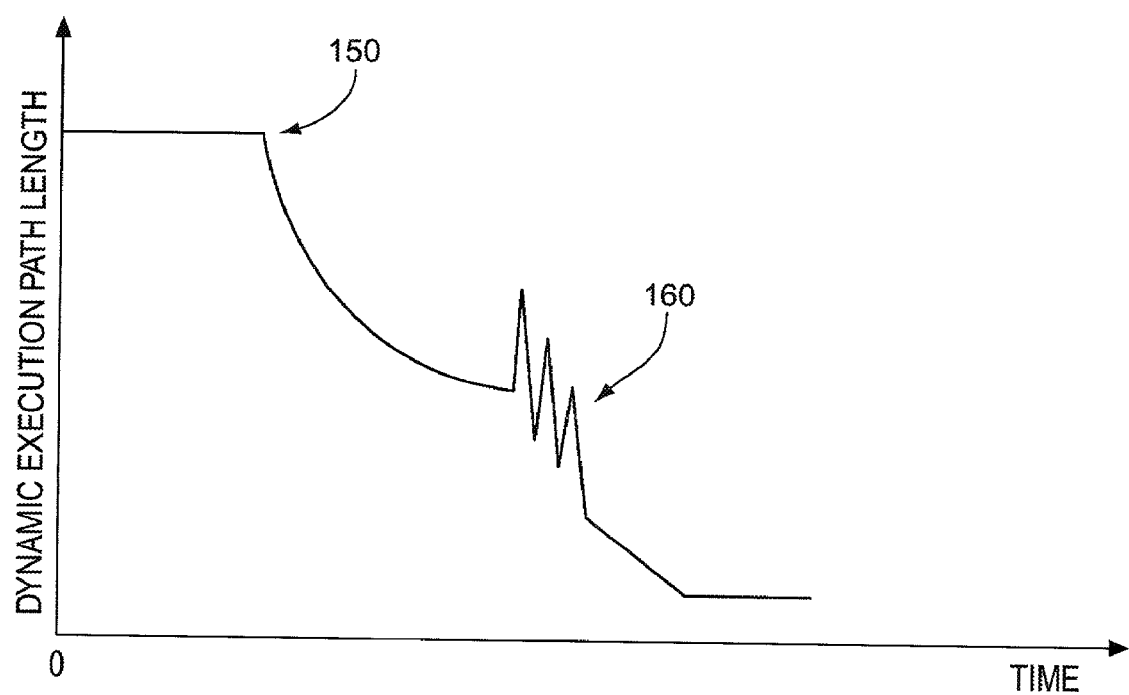
FIG. 3 illustrates a chart of enhanced performance of execution dynamic path length, over time, in accord with preferred optimization of execution units in accord with the invention.

Incremental advances accorded by step 111 will incrementally shorten the dynamic execution path length, such as shown in FIG. 3. In FIG. 3, dynamic execution path length is illustratively plotted over time. At time 0, processing begins such as at step 108. At time 150, the heuristics of other instruction paths are updated with the heuristics of a lead instruction path, as in step 112. Continued modification of the heuristics of certain paths between time 150 and time 160, based on leading heuristics (e.g., as discussed in connection with step 111, FIG. 2), may further reduce the dynamic execution path length to define new lead heuristics, as shown. By again modifying the heuristics at time 160 to the lead instruction path, and such as described in connection with step 112, FIG. 2, the path length may again decrease, as shown. In this manner, the invention may asymptotically approach the ideal processing heuristics for a given program thread to enhance per thread performance.

With further regard to FIG. 1, processor architecture 10 may therefore process instructions as described in connection with FIG. 2 and FIG. 3. Logic 50 monitors progress of like instructions along paths 12 and makes appropriate decisions to switch to different heuristics to provide enhanced performance. Effectively, the processing of like instructions is speculative since it is uncertain whether an architected state will result from any path. Processing of like instruction bundles through paths 12 is similar to a race; during the race the several paths process a range of speculative data, and the lead path with the best heuristics wins the race, and its thread may become an architected state. When a decision is made that one path is a leader, the other instruction paths are stalled and reallocated with improved heuristics, and processing of other threads may commence. Processing of like bundles through paths 12 may occur on two or more paths; for example, processing of the like bundles may occur on three paths 12, each with different heuristics; the two non-leading paths may be reallocated with different heuristics to improve processing of other bundles; the lead path is preferably not affected and continues processing. These paths may also be restarted with the same thread by backing up the program counter and reallocating all three heuristics, to asymptotically approach the ideal heuristics for all instruction paths.

The modification of heuristics 24, 28, 32 may take several forms. For example, logic 50 may randomize these heuristics to isolate the optimal characteristics for a given thread.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A method for optimizing the processing of instructions through a processor, comprising the steps of:
   (A) processing first like instructions through two or more instructions paths of the processor, each of the paths having different heuristics associated therewith;
   (B) monitoring progress of the first like instructions through the instruction paths;
   (C) determining which of the instruction paths is a first leader in processing the first like instructions; and
   (D) modifying heuristics of one or more of the instruction paths based on heuristics of the first leader.

2. A method of claim 1, further comprising grouping the first like instructions as a bundle from a common program thread.

3. A method of claim 1, the step of modifying comprising modifying heuristics of each of the instruction paths.

4. A method of claim 1, the step of modifying comprising modifying heuristics of instruction paths other than heuristics of the first leader.

5. A method of claim 1, further comprising processing the first like instructions through the first leader, the processing of the first like instructions through the first leader being unaffected by heuristics modified in the step of modifying.

6. A method of claim 1, further comprising processing additional instructions from a program thread of the first like instructions through the multiple instruction paths and without redundancy.

7. A method of claim 1, further comprising:
   processing second like instructions through two or more instructions paths of the processor, each of the paths having different heuristics associated therewith;
   monitoring progress of the second like instructions through the instruction paths;
   determining which of the instruction paths is a second leader in processing the instructions; and
   modifying heuristics of one or more of the instruction paths based on heuristics of the second leader.

8. A method of claim 1, the step of modifying comprising modifying one or more of CPU-bound heuristics and memory-bound heuristics.

9. A method of claim 1, the step of modifying comprising modifying heuristics based upon one or more of branch prediction and prefetch heuristics.

10. A method of claim 1, further comprising repeating steps (A)–(D) for modified heuristics within multiple instruction paths to asymptotically approach optimized characteristics for the instruction paths.

11. A processor for processing program instructions, comprising:
    at least two parallel instruction paths, each of the paths having an array of pipeline execution units and associated heuristics affecting how the instructions are processed therein; and
    assessment logic for monitoring processing of the instructions within the paths and for modifying the heuristics of at least one of the paths to improve per thread performance of the processor.

12. A system of claim 11, the heuristics of each of the instruction paths having one or more of fetch heuristics, execution heuristics, and cache heuristics.

13. A system of claim 11, the two parallel instruction paths comprising parallel core processors on a common die.

14. A system of claim 11, the parallel instruction paths constructed and arranged to initially process first like instructions therethrough, the assessment logic monitoring the processing of the first like instructions to determine optimized heuristics for the instruction paths.

15. A system of claim 14, the parallel instruction paths constructed and arranged to subsequently process different instructions therethrough to improve per thread processing performance.

16. A system of claim 14, the parallel instruction paths constructed and arranged to subsequently process second like instructions therethrough, the assessment logic monitoring the processing of the second like instructions to determine optimized heuristics for the instruction paths.

17. A system of claim 11, each of the parallel instruction paths forming a cluster constructed and arranged to process instructions as bundles.

18. A system of claim 11, the parallel instruction paths and assessment logic cooperating to process one or more bundles of like instructions through the instruction paths to monitor and then modify heuristics of the instruction paths to improve per thread processing of the instructions.

19. In a processor of the type having at least two parallel instruction paths, each of the paths having an array of pipeline execution units and associated heuristics affecting how the instructions are processed, the improvement comprising:

assessment logic for monitoring processing of the instructions within the paths and for modifying the heuristics of at least one of the paths to improve per thread performance of the processor.

20. In a processor of claim 19, the further improvement wherein the parallel instruction paths are constructed and arranged to initially process first like instructions therethrough, the assessment logic monitoring the processing of the first like instructions to determine optimized heuristics for the instruction paths.

* * * * *